United States Patent [19]

Muehlemann et al.

[11] Patent Number: 5,661,838

[45] Date of Patent: Aug. 26, 1997

[54] MULTIPLE FIBER OPTIC LIGHT LINE UNIT

[75] Inventors: Michael Mark Muehlemann, Liverpool; Robert B. Perry, Syracuse, both of N.Y.

[73] Assignee: Illumination Technologies, Inc., East Syracuse, N.Y.

[21] Appl. No.: 694,818

[22] Filed: Aug. 9, 1996

Related U.S. Application Data

[63] Continuation-in-part of Ser. No. 519,394, Aug. 25, 1995, Pat. No. 5,550,946.

[51] Int. Cl.$^6$ ..................................................... G02B 6/06
[52] U.S. Cl. ....................... 385/121; 385/120; 385/901; 362/32
[58] Field of Search ............................... 385/115, 116, 385/120, 121, 901; 362/32, 114

[56] References Cited

U.S. PATENT DOCUMENTS

| | | | |
|---|---|---|---|
| 3,192,843 | 7/1965 | Kapany et al. | 95/73 |
| 4,952,022 | 8/1990 | Genovese | 385/116 |
| 5,367,440 | 11/1994 | Gruszczynski et al. | 386/120 |
| 5,550,946 | 8/1996 | Muehlemann et al. | 385/121 |

*Primary Examiner*—Phan T. H. Palmer
*Attorney, Agent, or Firm*—Trapani & Molldrem

[57] ABSTRACT

A fiber optic light line unit provides a uniform linear beam of illumination onto a target, such as a traveling web. A number of fiber optic bundles have distal ends that are butted together end to end to create a long, seamless line of uniform strip lighting. The unit has a housing in which distal portions of the fiber optic bundles fan out so that the termini of the fibers are arrayed in a single continuous fiber row at a distal face plate of the housing. The ends of the row of each bundle abut the ends of the adjacent row from another bundle. In one embodiment the housing has first and second halves that sandwich the fiber termini, and there are respective sawtooth or similar recesses that each hold a respective fiber end or terminus. A cylindrical lens can be disposed with its axis across the linear beam of light. The fibers are held with their termini at a predetermined slant angle, e.g., thirty degrees, so that the light emanating from the unit impinges on a target at an angle. This reveals defects that may be oriented in the travel direction of the web.

12 Claims, 2 Drawing Sheets

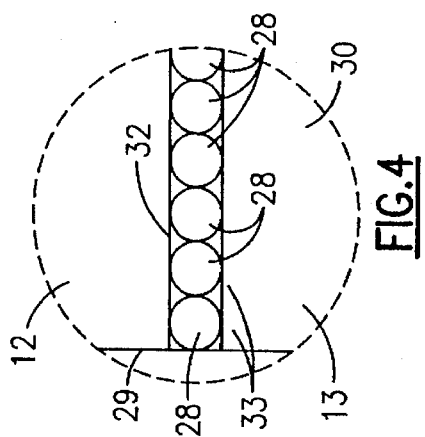
FIG.4
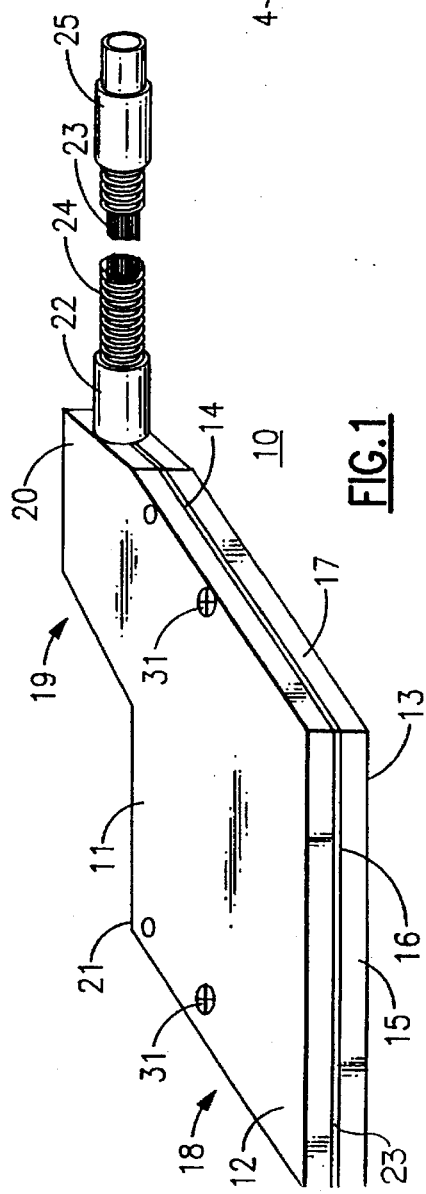
FIG.3
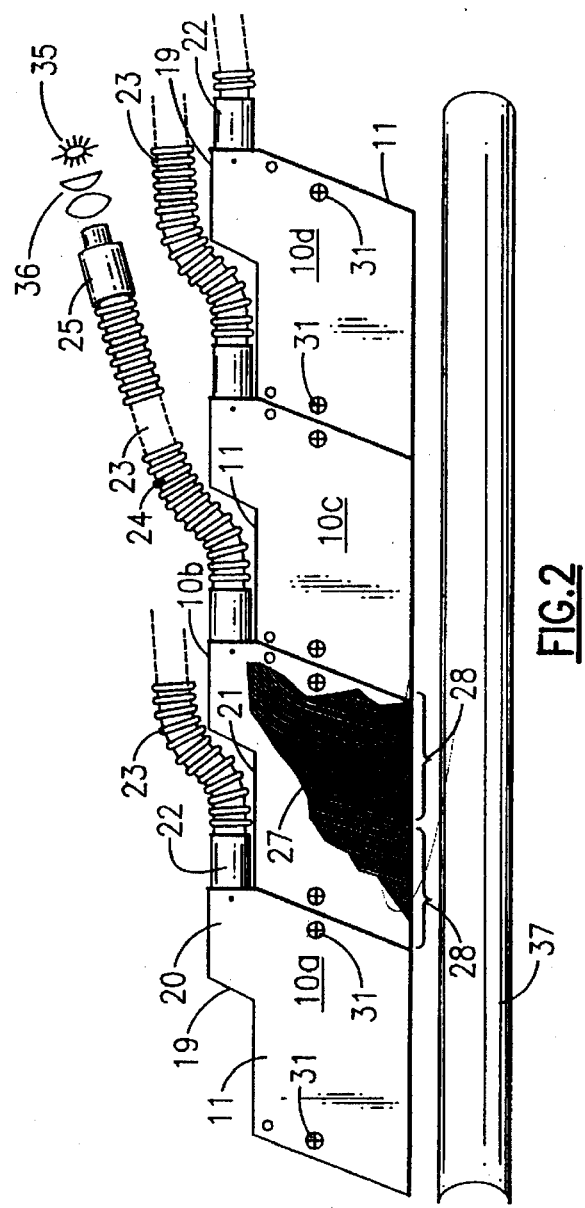
FIG.1
FIG.2

MULTIPLE FIBER OPTIC LIGHT LINE UNIT

This is a continuation-in-part of commonly-assigned, U.S. Pat. application Ser. No. 08/519,394, filed Aug. 25, 1995, now U.S. Pat. No. 5,550,946, issued Aug. 27, 1996.

BACKGROUND OF THE INVENTION

This invention relates to apparatus for illuminating an object and for providing a uniform, thin line of light onto an object for line scan applications. More specifically, the invention relates to light line units of modular design that can be butted end to end to provide very long, seamless linear beams of light. The invention is more particularly directed to an optical fiber based unit which can conduct light from a remote light source and convert the illumination from that source into a thin, long line of light.

Light line units are employed in a variety of applications where a long, narrow strip of light is needed. Light line units can be used in line scan applications, e.g., with line-scan type CCD cameras in web-type applications. The current preference for a light line unit employs a fluorescent tube and an elongated aperture to produce a line of light. The fluorescent tube light line units have difficulty producing a line of light that is uniform from one end of the line to the other, or a light that remains uniform over time. The fluorescent units have temperature-sensitive output fluctuations, and outputs that vary with age and with other conditions. Also, if two units are to be joined to provide a light line of extra length, there is additional illumination drop-off between modules.

Optical fibers have been used as line illuminators, and one example is described in U.S. Pat. No. 4,952,022 to Genovese. In the Genovese patent, the illuminating device is comprised of a bundle of large-diameter fibers, in which the distal ends or termini are deformed into a rectangular cross section. There, the idea was to produce a linear beam that is uniform along the output of the array. However, the patent does not address how to join two or more units to produce a very long linear beam with no drop-off or discontinuity from one modular unit to another. Another system for transmitting a linear beam of light from a lamp to a workpiece using optical fibers is described in U.S. Pat. No. 3,192,843 to Kapany et al. In the system of that patent, there are alternating layers of illuminating fibers and imaging fibers, and no provision for joining a number of traits end-to-end for any reason.

In a number of industrial applications, it is necessary to provide a line of illumination up to several meters in length, and with uniformities of better than 10% in a transmission or reflective mode. A typical application can be automated quality inspection of a web type product that travels past, for example a fabric or carpet. The quality of the inspection depends entirely on the uniformity of the light source, that is, on uniformity across the light line. Such high uniformity has been difficult to achieve using standard techniques, such as apertured fluorescent lamps. In addition, inspection of heat-sensitive materials requires remoting the light source from the product, and this has been impossible with conventional linear light sources.

OBJECT AND SUMMARY OF THE INVENTION

It is an object of the present invention to provide a lightline arrangement that provides a continuous, linear beam of light without gaps or discontinuances in the beam of light from one end to the other.

It is another object to provide a light line unit, that is a linear light beam source, that produces a line of light that is uniform across its length and creates a seamless, long line of uniform illumination.

It is another object to provide a simple, robust assembly in which a plurality of flexible fiber optic bundles carry illumination from respective remote light sources to the lightline unit.

It is a further object to provide a light line with a significantly enhanced light output as compared with conventional linear light sources.

It is another object to provide a light line unit that can be routinely reconfigured to meet varying application needs, can accommodate specific working distance and environmental requirements, and can meet dimensional limitations.

It is a more specific object to provide a light line unit that facilitates detection of defects and anomalies in a traveling web, particularly any defects that are elongated in the direction of travel.

According to an aspect of the invention, a modular fiber optic light line unit produces a thin, continuous line of illumination, and a number of these units can be joined together end to end to produce a long, seamless linear light beam. The units have a housing with a flat distal face member from which the line of light emanates, and a fiber optic bundle that is formed of a plurality of optical fibers. A sheath, e.g., a flexible vinyl tube contains the proximal end of the bundle that extends from the housing, and a coupling at the distal end connects to a light source. The proximal part of the fiber bundle is contained within the housing, and is fanned out so that the distal ends or termini of the fibers are arrayed in a single-thickness row of fibers that extends over the length of the distal face of the housing from a first end edge to a second end edge. The distal face member of the housing extends in a transverse direction and defines an axis that is normal to the transverse direction. The distal face member also contains structure that holds the termini of the fibers in a continuous row to define the light line. In one preferred embodiment, the housing is formed of first and second halves that meet at this line with the optical fibers held in place therebetween. The row of fibers has its ends flush with the first and second end edges of the distal face member of the housing. In this fashion, when two or more modular units are butted together, there are no gaps in the combined rows of optical fibers, and the light line from the several units is presented as a continuous, seamless thin linear beam, without drop-out between time. The light line units can be used for white light, specific color light, infrared, or ultraviolet illumination.

The housing can be made of anodized aluminum, and the optical fibers can be polymer fibers, for example with a diameter of 0.030 inches.

The fibers are situated at a predetermined slant angle, e.g., about 30 degrees, so that the light exits the unit at a desired angle with respect to the front face of the unit, and impinges on the web are slant angle. That is, the fibers are oriented at an angle to the axis which is normal to the transverse plane occupied by the front or distal face member. Preferably, the termini of the fibers are also angled to be flush with the face member of the housing. The slant angle of the fibers combined with the further refractive bending at the termini of the fibers causes the light to impinge onto the web at a finite predetermined angle (e.g., 45°) relative to the normal. This reveals any linear defects, e.g., folds, cracks, and the like, that are oriented in the travel direction of the web.

The above and many other objects, features, and advantages of this invention will become apparent from the ensuing description of a preferred embodiment, which should be read in connection with the accompanying Drawing.

BRIEF DESCRIPTION OF THE DRAWING

FIG. 1 is a perspective view of a modular light line unit according to one embodiment of this invention.

FIG. 2 is an elevational view showing an arrangement of a series of modular units of this invention for providing a long, seamless linear beam.

FIG. 3 is a plan view showing the distal face of the unit of this embodiment.

FIG. 4 is an enlargement of the area identified at 4 in FIG. 3.

DETAILED DESCRIPTION OF THE PREFERRED EMBODIMENT

Figure 6:
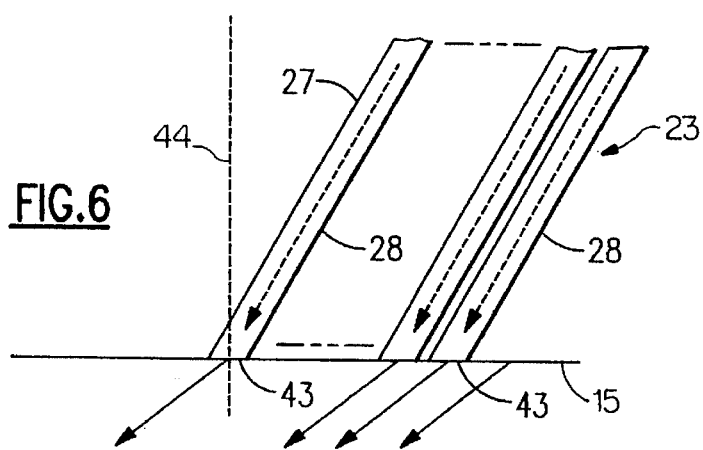
FIGS. 6 and 7 are perspective views respectively of the optical fibers showing the arrangement of their termini.

With reference to the Drawing, a modular light line unit 10 has a housing or casing 11 formed of a first housing half 12 and a second housing half 13. Here, the halves 12, 13 are preferably made of a cast anodized aluminum, although many other suitable materials exist. The halves fit together at a join line 14. At a lower or distal side of the housing 11 is an elongated flat distal face plate 15, where the join line 14 defines a light line 16, and from the latter emanates the light line or linear beam of illumination. The housing 11 has a first side 17 at an obtuse angle to the face plate 15 and an opposed second side 18 parallel to side 17 and at an acute angle to the face plate 15. These can be approximately 60 and 90 degrees, respectively. These sides 17, 18 rise to a stepped top or proximal side 19, Such that the housing 11 has a shoulder 20 at the first side 17 and a recess 21 at the second side 18. A laterally protruding block 22 is formed at the shoulder 20 on the side 17 near the proximal wall 19, and a flexible fiber optic bundle 23 extends out of the housing from this block 22. A flexible vinyl tubular protective sheath 24 covers the proximal portion of the fiber optic bundle 23. Not shown here, a strain relief protects the fiber bundle as it enters the block 22. At the proximal end of the bundle 23 and sheath 24 is a coupler 25 that fits a mating receptacle in a standard light source (not shown). In a preferred embodiment, the bundle 23 is comprised of polymer optical fibers with a diameter of 0.030 inches. However, in other embodiments, glass fibers or other optical fibers could be used.

As shown in cutaway in FIG. 2, within the housing 11 a distal portion 27 of the fiber optic bundle 23 fans out into a single layer, and ends or termini 28 of the optical fibers are arranged side-by-side into a single row to form the light line 16 on the face plate 15. Here, the ends of the row of optical fibers are flush with the end edges of the face plate 15 at the positions of the first and second sides 17 and 18. This permits a number of the modular units 10 to be joined end to end to form a single uninterrupted light line, as will be discussed shortly. Most favorably, each terminus 28 is configured and polished for optimal light distribution.

The optical fibers are arranged so that their distal termini 28 are parallel and are all disposed at a predetermined slant angle (e.g., 60°) with respect to the face plate 15, that is, about 30° with respect to the proximal-distal axis of the unit.

As illustrated in FIGS. 3 and 4, the distal face plate 15 is formed in two parts that join together at the join line 14 with the optical fiber termini 28 sandwiched between them. On the upper housing half 12 is an upper half 29 of the face plate 15, and on the lower housing half 13 is a lower half 30 of the face plate. The termini 28 are clamped between the upper and lower halves 29, 30 when the housing halves 12, 13 are fastened together, e.g., with screws 31, 31 (FIGS. 1,2). In this embodiment, the halves 29, 30 have smooth facing edges. As shown in FIG. 4, an end terminus 34, here the left-most fiber, lies flush with the end edge of the face plate 15 at the second side 18 of the housing. A similar end fiber is disposed flush with the opposite end edge at the first side 17.

In alternative embodiments, the edges 32 and 33 could have recesses or serrations of sawtooth shape, or the same could be undular or crenellate in shape.

Referring again to FIG. 2, a series of modular units 10a, 10b, 10c, and 10d are shown butt-joined, with side 17 of one unit joined to side 18 of the next. More or fewer traits 10 could be employed, depending on the application. Three, four, or more units can be favorably combined. Clamping structure, not shown here, can be employed as needed for a given application, and this would be within the capability of the user. Each unit 10 has its respective fiber bundle 23 associated with a suitable light source, with the coupler 25 fitted to the light source as appropriate. For the sake of illustration, a lamp 35 and collimator lens group 36 are shown schematically with respect to one of the units 10b. It is possible with suitable are couplers to join more than one unit 10 to a given light source. The intensity of illumination can be controlled in known fashion using diaphragms or filters contained in the light sources.

Here, the shoulders 20 and recesses 21 permit the units to be coupled adjacent to one another, with the fiber bundles 23 riding over the stepped proximal wall 19 of the next modular unit 10. With the units 10a to 10d butted together end to end as shown, the units together produce a single seamless, continuous line of light, with no gaps at the junctions of the units 10a to 10d.

Figure 7:
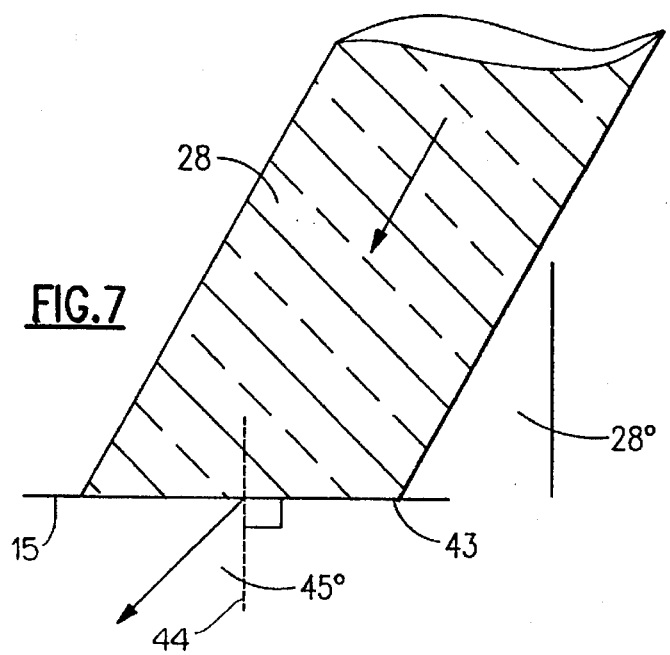
Figure 5:
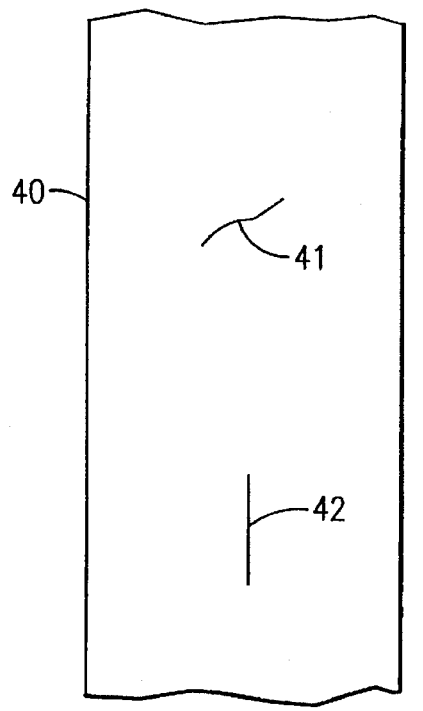
FIG. 5 is a plan view of a web, as inspected with devices of this embodiment.

The advantages of the arrangement of this invention can be understood from FIGS. 5, 6, and 7.

As shown in FIG. 5, an elongated web 40, which can be a metal plate or foil, or a plastic or glass sheet, for example, travels in the lengthwise direction. A typical defect 41 is oriented in a random direction on the web 40, and will create a shadow under any uniform linear illumination. This can be picked up using video camera equipment, which can be configured for automatically alerting an attendant to the presence of the defect. However, a linear defect 42, that is, a defect that is oriented in the running or travel direction of the web 40, will not create a shadow if the illumination is directed at right angles to the plane of the web and to the travel direction of the web. In order to address this problem, the modular light line units 10 project the line of light at an angle of about 45° relative to the plane of the web 40, and this reveals both types of defects 41 and 42.

As further illustrated in FIGS. 6 and 7, the optical fibers of the bundle 23 have their termini 28 lying parallel to one another and at an angle on the order of thirty degrees from an axis 44 normal to the face plate 15. In a preferred mode, this angle can be between twenty-eight and twenty-nine degrees. Also, as shown here the termini of the fibers lie in a plane at right angles to the face plate 15.

The termini 28 have front faces 43 that are ground flat in the plane of the face plate 15. In one typical embodiment, the optical fibers have a core index of refraction $N_c$ of 1.492. This means that at the front faces 43, the light will be refracted an additional angle, and at this index of refraction this is about an additional seventeen degrees. More specifically, the fibers have a face angle of 28.29 degrees, which produces a refractive angle of an additional 16.71 degrees, so that the effective exit angle from the normal axix 44. (See FIGS. 6 and 7) is forty-five degrees. Here, the exit angle is in the same plane as the direction normal to the face plate (i.e., the plane of the Drawing figures) but that is not always required. The slant angle of the fibers relative to the normal can be selected for any desired exit angle. Of course, the slant angle should not exceed the critical (total reflection) angle for the fiber's index of refraction.

Also shown in FIG. 2 is an optional cylindrical lens 37, disposed with its cylindrical axis across the linear beam of light. In many possible configurations, the lens 37 could be omitted, and in others another type of lens could be employed.

In some alternative embodiments, a single exterior housing could be employed to contain the distal ends of several optical fiber bundles. In that case, suitable means inside the housing would hold the distal termini of each respective bundle in a continuous row, with one end of each row abutting an end of the row of the next adjacent bundle. This will produce a continuous line without gaps at the locations where the ends of the rows abut one another. This will also produce a continuous elongated linear beam of light. A cylindrical lens, e.g., lens 37, or other light concentrating means, can be disposed with its cylindrical axis across the linear beam, similar to the construction shown in FIG. 2.

While the invention has been described with reference to a single preferred embodiment, it should be recognized that the invention is not limited to that precise embodiment. Rather, many modifications and variations will be apparent to persons skilled in the art without departing from the scope and spirit of this invention, as defined in the appended claims.

We claim:

1. A linear fiber optic light line arrangement for producing a thin, continuous, linear beam of illumination, comprising a housing having a distal face from which said line of illumination emanates, said distal face extending in a transverse direction and defining an axis that is normal to said transverse direction;

a plurality of fiber optic bundles, each bundle being formed of a plurality of optic fibers, with each bundle including a proximal portion carried in a respective sheath, each said proximal portion including means to receive light from a light source, and a distal portion disposed within said housing, with optic fibers in said distal portion being fanned out to terminate in a flat linear array; and means for holding distal termini of the fibers of the distal portion of each said bundle in a respective continuous row that extends from one end to another end of the respective row, and for holding said fibers such that one end of each respective row is disposed abutting an end of the row of another of said bundles, so that the plurality of fibers form a continuous line of fibers with no gaps at locations at which the ends of said rows abut one another, and so that the light emanates from said fibers at a predetermined exit angle relative to said axis that is normal to said transverse direction.

2. The linear fiber optic light line arrangement according to claim 1, further comprising a cylindrical lens disposed having a cylindrical axis across said linear beam of illumination.

3. The linear fiber optic light line arrangement according to claim 1, wherein said plurality of fiber optic bundles comprises three or more fiber optic bundles.

4. The linear fiber optic light line arrangement according to claim 1, wherein said plurality of fiber optic bundles comprises four or more fiber optic bundles.

5. Modular fiber optic light line unit for producing a thin, continuous line of illumination, comprising a housing having a distal face from which said line of illumination emanates, said distal face extending from a first end edge to a second end edge of said housing and defining an axis normal to said distal face; and a fiber optic bundle formed of a plurality of optical fibers, said bundle including a proximal portion carried in a sheath, said proximal portion including means to receive light from a light source, and a distal portion disposed within said housing, with the optical fibers in said distal portion being fanned out to terminate in a flat linear array;

wherein said distal face of said housing includes means for holding distal termini of said optical fibers in a continuous row that extends the length of said distal face and with said termini lying parallel to one another at a predetermined slant angle relative to said axis normal to said distal face, so that said light is projected at a finite predetermined exit angle relative to said axis.

6. The modular light line unit according to claim 5 wherein said exit angle is in the plane of said axis.

7. The modular light line unit according to claim 5 wherein said exit angle is on the order of 45°.

8. The modular light line unit according to claim 5 wherein said termini have front faces that are ground flat in the plane of said distal face.

9. The modular light line unit according to claim 5 wherein said housing has first and second sides, at said first and second edges of said distal face, that are parallel to one another but are slanted at an angle relative to said distal face.

10. The modular light line unit according to claim 9 wherein said angle is about sixty degrees relative to said distal face.

11. A linear fiber optic light line arrangement for producing a thin, continuous, linear beam of illumination, comprising a housing having a distal face from which said line of illumination emanates, said distal face extending in a transverse direction and defining an axis that is normal to said transverse direction;

a plurality of fiber optic bundles, each bundle being formed of a plurality of optic fibers, with each bundle including a proximal portion carried in a respective sheath, each said proximal portion including means to receive light from a light source, and a distal portion disposed within said housing, with optic fibers in said distal portion being fanned out to terminate in a flat linear array; and means for holding distal termini of the fibers of the distal portions of said bundles in a continuous row that traverses from one end to another end of the housing, so that said fibers are positioned at a predetermined slant angle relative to said axis, such that the light emanates from said fibers at a predetermined exit angle relative to said axis.

12. The linear fiber optic arrangement according to claim 11 wherein said exit angle is on the order of 45°.

* * * * *